Patented Jan. 17, 1950

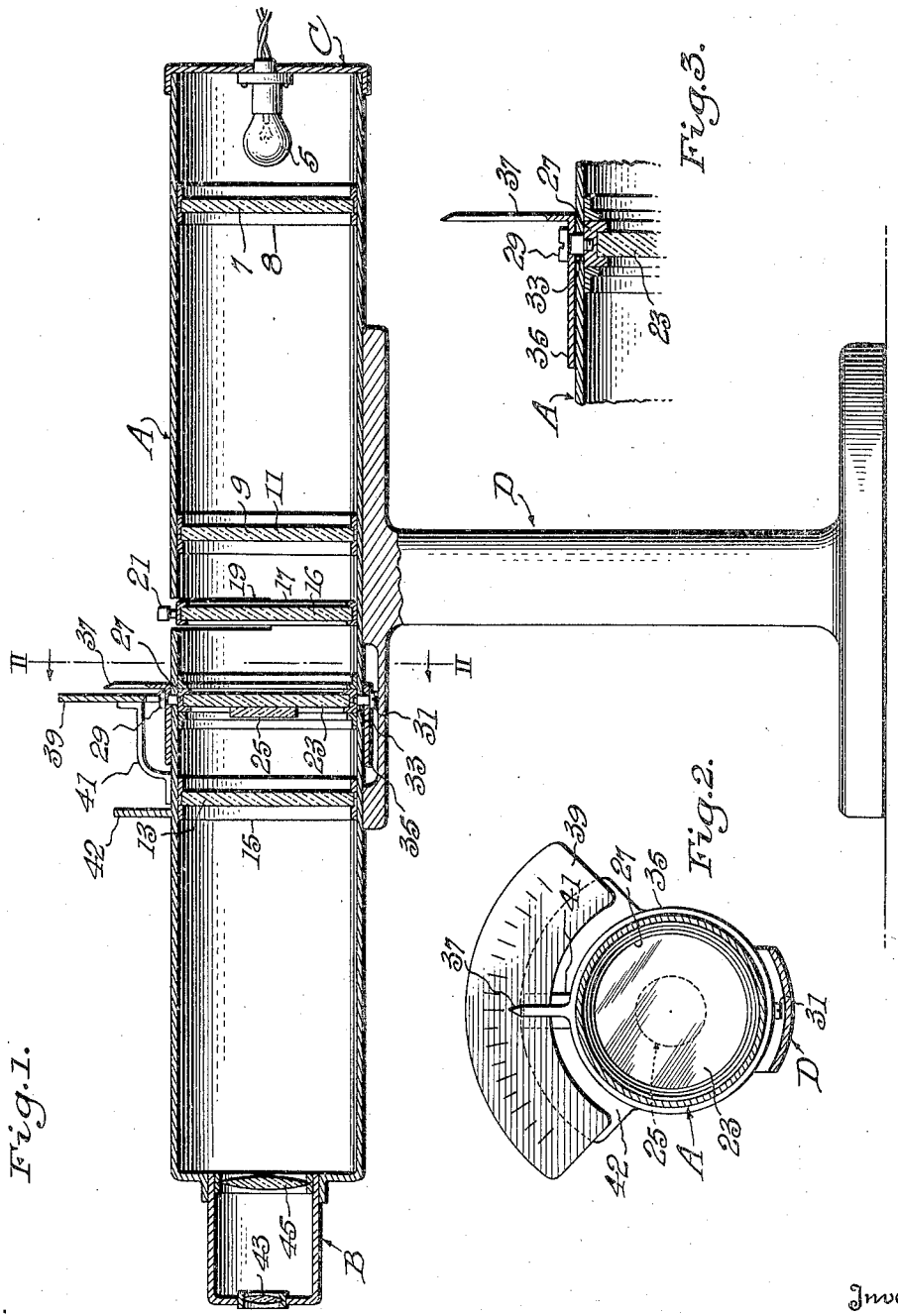

2,494,543

UNITED STATES PATENT OFFICE 2,494,543

LIGHT POLARIZING APPARATUS FOR DETERMINING COLOR BLINDNESS

Robert L. Clarke, Albany, N. Y.

Application December 31, 1948, Serial No. 68,444

3 Claims. (Cl. 88—20)

(Granted under the act of March 3, 1883, as amended April 30, 1928; 370 O. G. 757)

The invention described herein may be manufactured and used by or for the Government for governmental purposes, without payment to me of any royalty thereon.

The present invention pertains to an optical device for quantitatively measuring the degree of color blindness in individuals, which determination is of value under many given conditions and circumstances. So far as is known, prior to this invention there have been available no procedures for accurately quantitatively determining or measuring the color perception of an individual.

The invention has for one of its objects the provision of an improved apparatus and procedure, which is based not upon what one person can see and what another person cannot see, but which is based upon the ability of a single individual to reproduce his results in comparing two colors.

A further object of the invention is to provide an instrument of the above-indicated character which permits the matching of one disc which may be varied in color by fine gradations with a background of constant color, which is the color to which the color-sensitivity of the individual is to be tested.

Further objects of the invention will become apparent as the description proceeds, and the features of novelty will be pointed out in particularity in the appended claims.

The invention will be understood more readily by reference to the accompanying drawings, in which:

Fig. 1 is a longitudinal sectional elevation of an improved apparatus of the present invention;

Fig. 2 is a transverse sectional elevation taken on the line II—II of Fig. 1; and Fig. 3 is a fragmentary enlarged sectional detailed view of a portion of the device shown in Fig. 1.

Referring more particularly to the drawings, the improved device of the present invention may comprise a tubular, substantially cylindrical housing A, the forward end of which includes an eye-piece B, and the rear end of which is closed by a closure cap C. The instrument is mounted on a suitable stand D.

Interiorly of the closure cap C, there is mounted thereon a source of light 5 in advance of which is a light-diffusing disc 7 that is mounted fixedly in an annular holder 8 permanently secured to the interior of the housing A. The disc 7 is adapted to pass uniformly diffused light from the source 5 to a suitable forward polarizing member 9, which is secured in a holder 11, secured to the interior of the housing A. A second or rear polarizing member 13 similarly mounted in a holder 15, is spaced suitably from the polarizing member 9. The polarizing members 9 and 13 may be discs, and are mounted with their planes of polarization crossed, so that no visible light will be passed to the eye-piece B through the polarizing members 9 and 13. Between these polarizing members there is mounted a film 16 of birefringent substance, such as mica, this film being of uniform thickness and held in an annular holder 17, that is adapted to be mounted removably in slot 19 in the housing A, so that the film or sheet 16 may be replaced with a similar unit of different thickness for producing another selected color background for the individual to be tested. Manipulation of the holder 17 is effected conveniently by providing a handle 21 thereon which may be grasped conveniently between the thumb and finger of the operator. The film or mica sheet 16 is mounted so as to be oriented at an angle of 45° from its extinction position when located between and parallel to the crossed polarizing members. It thus produces a background of constant color, such as blue, or green, or red, for example, that is, the color to which sensitivity is being tested. The color is dependent upon the thickness of the mica sheet or film 16 and its degree of birefringence.

Also positioned between the polarizing members 9 and 13, and spaced suitably in advance of or behind the background film 16, is a strain-free glass disc 23, carrying a small disc 25 of birefringent material, such as mica, which is of a constant thickness and of such a thickness and degree of birefringence as to give a low order polarization color such as a first order of white when viewed in the instrument with the background film 16 removed and the disc 25 oriented at an angle of 45° from its extinction position. This disc 25 should be so oriented with respect to rotation parallel to disc 23 that it is in its extinction position when the pointer 37 described below is indicating the center of the attached scale 39. The disc 25 is mounted on the forward side of the glass disc 23 and has a diameter of approximately one-third that of the background film 16.

The glass disc 23 is carried in an annular holder 27 that is rotatably mounted in the housing A by means of screws 29, 31 which enter the holder 27 and rotate in slots 33 in the housing A. The screws 29, 31 retain a sleeve 35 on the housing, this sleeve 35 carrying an indicating pointer 37 which is adapted to move over a scale 39 mounted outside of the housing A on a bracket 41. The scale is turned away from the operator. The obstruction of observation of the relation of the pointer 37 to the scale 39 by the operator, i. e., the person being tested, is accomplished by suitable means such as a view shield 42 placed in advance of the scale-pointer assembly. The eye-piece B is provided with a lens system 43, 45, which is focused on the small disc 25 and includes all of disc 23 in its field.

This birefringent disc 25 with its glass disc 28 and the pointer 37 are turnable through an arc of approximately 90°. When the disc 25 is rotated by turning sleeve 35 with the hand exactly to a position of extinction under polarized light, its color will match the background color perfectly and a uniform field of color remains. It is the reproducibility in placing this rotating disc in the position of extinction which measures the color blindness of an individual, for the color of the rotating disc 25 approaches the color of the background disc gradually as the extinction position is approached. Such reproducibility varies from about ±0.5 for a normal person to a total lack of reproducibility for a totally color blind individual.

The background color imparted by the film or disc 16 is dependent upon the thickness and composition of the film, the film 16 being replaceable with a similar film of different thickness for obtaining a predetermined different background color against which the color responsiveness or sensitivity of a subject individual is being tested. In any event, the disc 16 is a thin film and according to the thickness of the films, the background colors imparted by selected films may include almost the entire range of the visible spectrum.

The construction herein described and illustrated represents one embodiment of the invention, and shows an illustrative form of apparatus embracing the improved principles of the invention. It will be apparent, however, that various structural details may be modified without departing from the inventive concept, and there is provided by the invention a simple means for the accurate quantitative determination of the sense of color perception in any given subject individual, such modification in structural details being readily obvious to one skilled in the art to which the invention relates. Accordingly, it will be understood that it is intended and desired to embrace within the scope of this invention such modifications and changes as may be necessary to adapt it to varying conditions and uses, as defined in the appended claims.

Having thus described my invention, what I claim as new and wish to secure by Letters Patent is:

1. Apparatus for measuring color blindness in individuals, comprising, in combination, a closed cylindrical housing having a forward end and a rear end, an eye-piece mounted in the forward end, a source of light mounted in the rear end interiorly of the housing, spaced forward and rear polarizing means in the housing having their planes of polarization crossed relative to each other for extinguishing visible light passing from the source, a relatively large transparent birefringent background film mounted in the housing in advance of the rear polarizing means and oriented at substantially 45° from its extinction position for producing a uniform background color, a transparent birefringent disc having a substantially smaller area than that of the background film mounted intermediate the background film and the forward polarizing means for producing, in conjunction with the background color, a disc of color different from that of the background, means for rotating the birefringent disc until its color matches perfectly that of the background in its extinction position, means for indicating the position of rotation of the disc when a perfect match with the background is thought to be had, and a lens system in the eyepiece focused on the birefringent disc.

2. Apparatus for measuring color blindness in individuals, which comprises, in combination, a closed housing having a forward end and a rear end, an eye-piece mounted on the forward end, a source of light mounted on the rear end interiorly of the housing, spaced forward and rear polarizing means in the housing having their planes of polarization crossed relative to each other for extinguishing light passing from the source, light diffusing means intermediate the light source and the rear polarizing means, a relatively large transparent birefringent background film mounted in the housing in advance of the rear polarizing means and oriented at substantially 45° from its extinction position for producing a uniform background color, means enabling replacement of the said sheet with a similar sheet of different thickness for producing another selected background color, a transparent birefringent disc having an area substantially smaller than that of the background film mounted rearwardly of the forward polarizing means for producing, in conjunction with the background color, a disc of color different from that of the background, means for rotating the birefringent disc until its color matches perfectly that of the background in its extinction position, means for indicating the position of rotation of the disc when a perfect match with the background is thought to be had, and a lens system in the eye-piece focused on the birefringent disc.

3. Apparatus for measuring color blindness in individuals, which comprises, in combination, a closed housing having a forward end and a rear end, an eye-piece mounted on the forward end, a source of light mounted on the rear end interiorly of the housing, spaced forward and rear polarizing means in the housing having their planes of polarization crossed relative to each other for extinguishing light passing from the source, light diffusing means intermediate the light source and the rear polarizing means, a relatively large transparent birefringent background film mounted in the housing and oriented at substantially 45° from its extinction position for producing a uniform background color, means enabling replacement of the said film with a film of a different substance for producing another selected background color, a transparent birefringent disc having an area substantially smaller than that of the background film mounted rearwardly of the forward polarizing means for producing, in conjunction with the background color, a disc of color different from that of the background, means for rotating the birefringent disc until its color matches perfectly that of the background in its extinction position, means for indicating the position of rotation of the disc when a perfect match with the background is thought to be had, and a lens system in the eye-piece focused on the birefringent disc.

ROBERT L. CLARKE.

REFERENCES CITED

The following references are of record in the file of this patent:

UNITED STATES PATENTS

| Number | Name | Date |
| --- | --- | --- |
| 1,476,102 | Pichard et al. | Dec. 4, 1923 |
| 2,393,968 | Burchell et al. | Feb. 5, 1946 |
| 2,473,857 | Burchell | June 21, 1949 |